R. V. MATTISON, Jr.
METHOD OF MANUFACTURING FIBROUS CEMENT PRODUCTS.
APPLICATION FILED FEB. 12, 1919.
1,327,721. Patented Jan. 13, 1920.
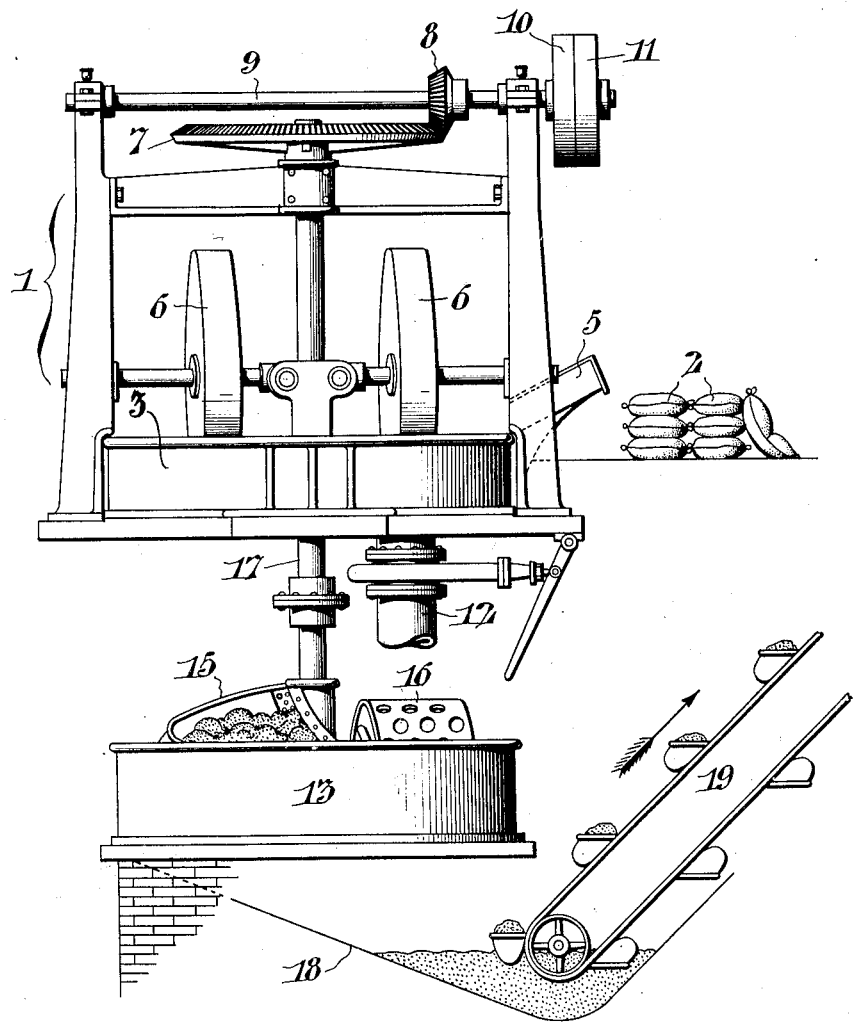
FIG. I.

R. V. MATTISON, Jr.
METHOD OF MANUFACTURING FIBROUS CEMENT PRODUCTS.
APPLICATION FILED FEB. 12, 1919.
1,327,721.  Patented Jan. 13, 1920.
4 SHEETS—SHEET 2.
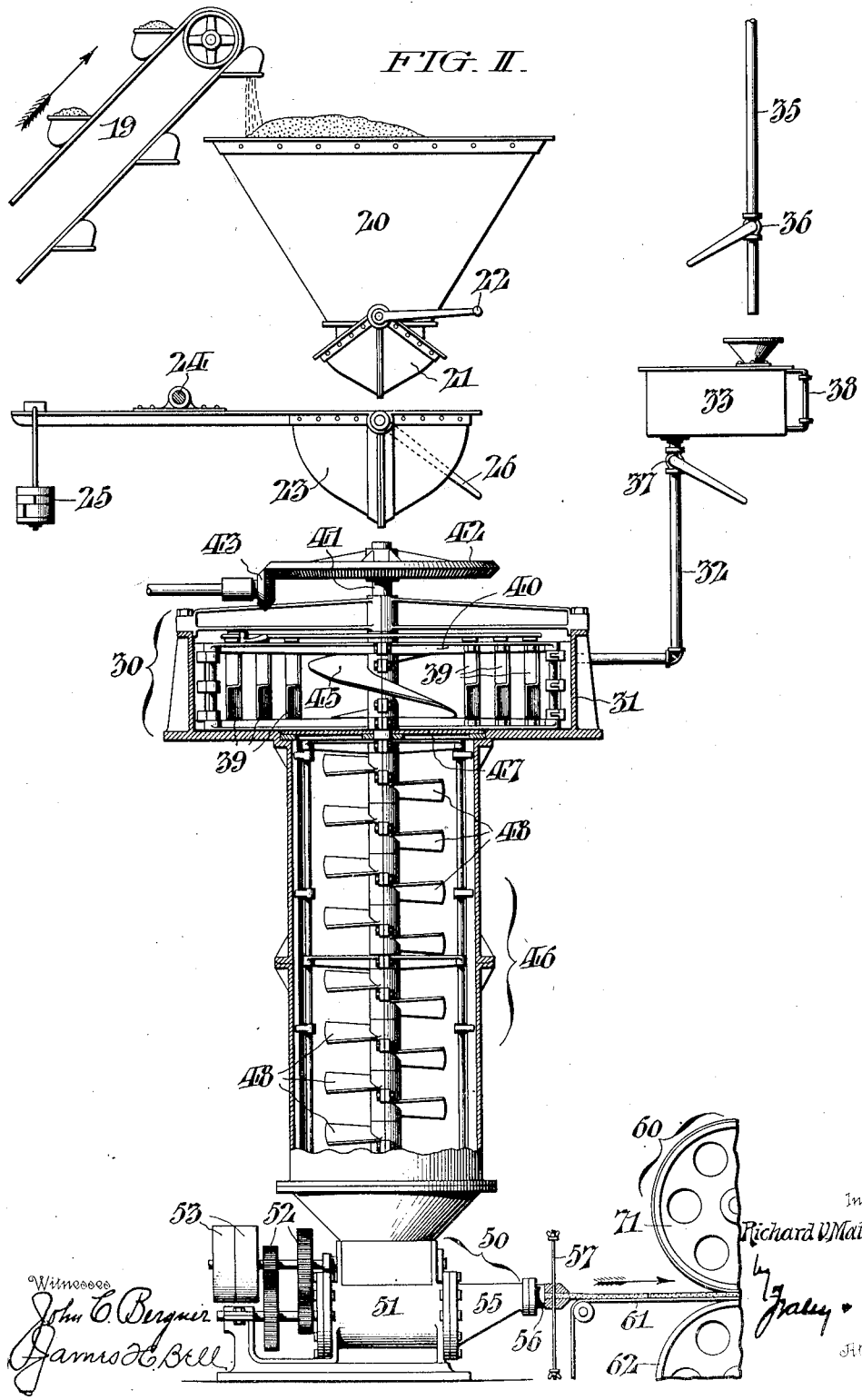

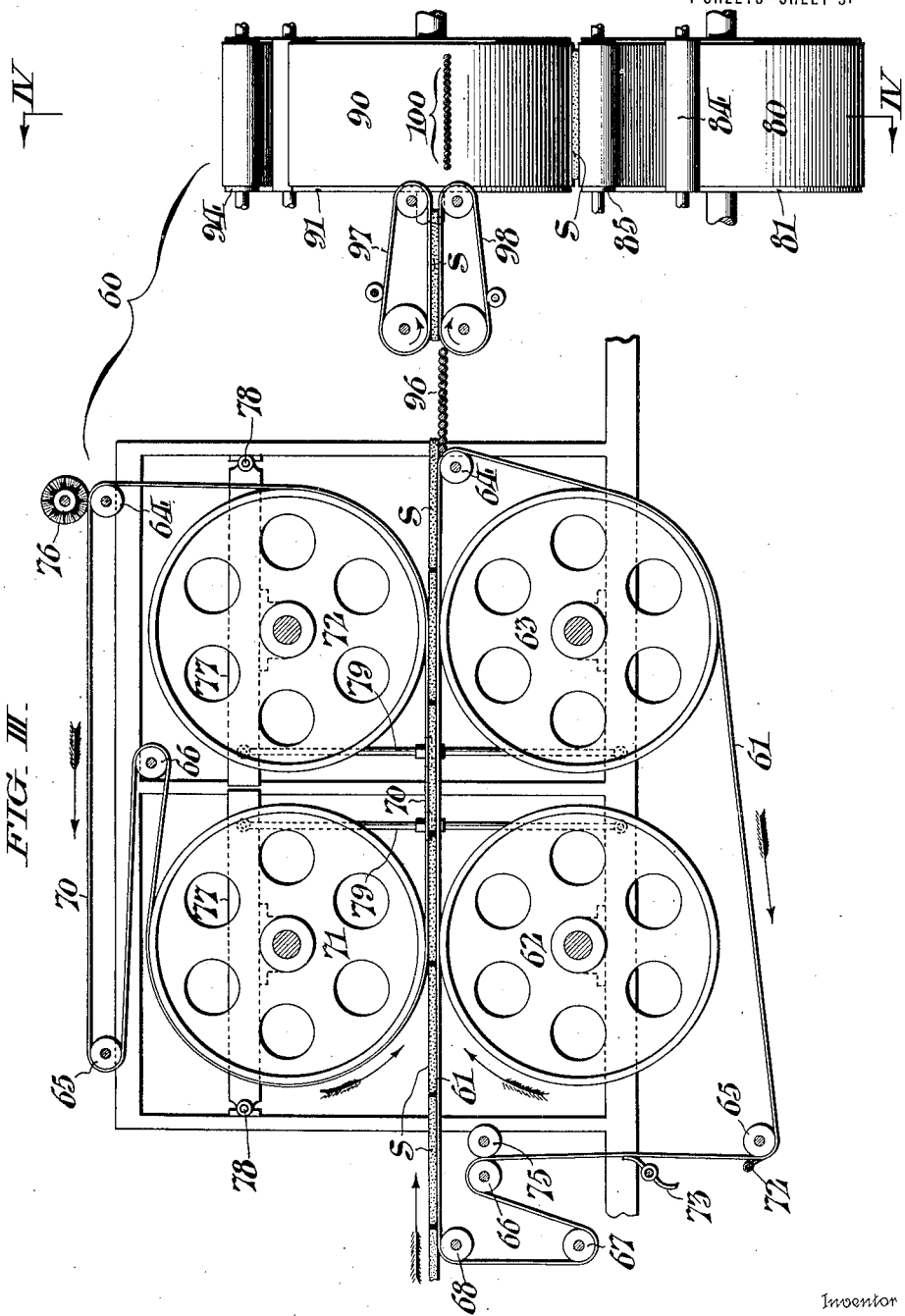

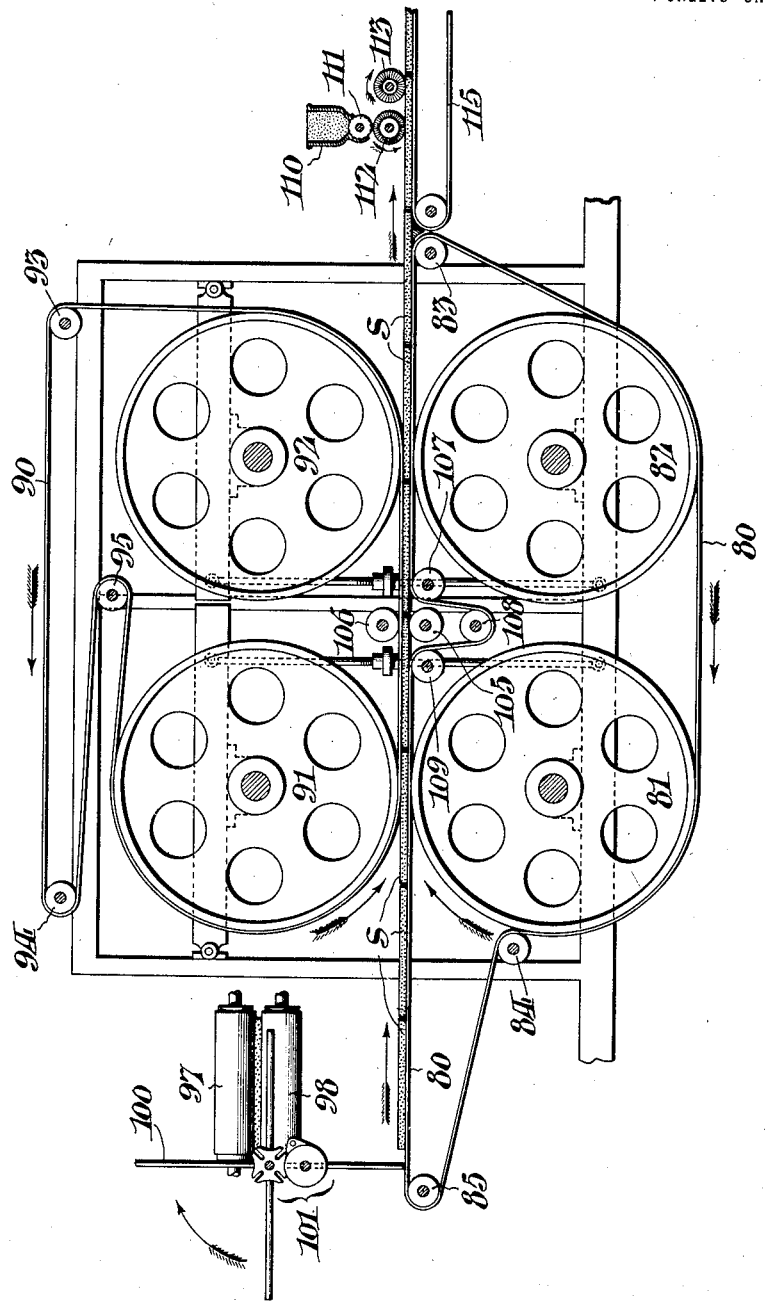

UNITED STATES PATENT OFFICE.

RICHARD V. MATTISON, JR., OF UPPER DUBLIN TOWNSHIP, MONTGOMERY COUNTY, PENNSYLVANIA.

METHOD OF MANUFACTURING FIBROUS CEMENT PRODUCTS.

1,327,721.  Specification of Letters Patent.  Patented Jan. 13, 1920.

Application filed February 12, 1919. Serial No. 276,679.

*To all whom it may concern:*

Be it known that I, RICHARD V. MATTISON, Jr., a citizen of the United States, residing in Upper Dublin township, in the county of Montgomery and State of Pennsylvania, have invented a certain new and useful Method of Manufacturing Fibrous Cement Products, of which the following is a specification, reference being had to the accompanying drawings.

My invention is directed to the continuous production of cement structural elements, such, for example, as cement shingles. By the proper addition of a fibrous element to the cement, I have found it possible to treat it by a succession of steps which result in continuity of the process.

As is already well known, clay is capable of being worked in an auger mill, from which it may be forced through a die in a continuous stream and thereafter cut into convenient lengths depending upon the use for which the products are intended. It has however heretofore been found impossible to produce satisfactory results in substituting cement for the clay in such a process, since cement lacks the tenacity or "temper" requisite under such conditions of working. I have found that by employing in combination with the cement a short fibrous material, such, for instance, as asbestos waste, a suitable quantity of water being added, a plastic mass is produced which may be readily worked through the different steps of the process without danger of disintegration or rupture.

Caution must, however, be exercised in this instance, in the manner of mixing the necessary ingredients so that an absolutely homogeneous plastic mass of the material is assured before its admission to the auger mill. This condition I procure by first of all, subjecting the fibrous material to a thorough crushing operation whereby the latter is disintegrated into its individual fibers. The cement is then added and the two ingredients subjected, in a dry state, to a mixing operation to insure a thorough intermingling of the particles. A measured proportion of water is next added, and the mixture continuously agitated in a "wet" mixer until the desired homogeneous plastic mass is obtained. It is thence discharged into a storage receptacle of sufficient size to act as an equalizing reservoir, insuring homogeneity of the product notwithstanding slight variations between successive charges.

The process according to my invention is completed by forcing the plastic compound through a suitable die, whereby it is formed into a continuously flowing ribbon which, directly after its formation, is cut transversely into sheets or forms of uniform size.

In order to extract the excess moisture from the sheets and at the same time impart a finish thereto, said sheets are subjected to treatment in a rolling machine whereby they are first rolled in one direction and then in another, preferably at right angles to the first. The sheets may then be stored for a sufficient period to permit proper setting or they may be first presented to a color applying device for tinting.

The exact manner in which these various operations are performed will be best understood from the following description which refers to a series of accompanying illustrations of the apparatus conveniently adaptable to the purpose of my invention.

In the drawings, Figure I is an elevation of a crushing mill and a "dry" mixer coupled to it for simultaneous operation, by which the asbestos is first disintegrated and afterward dry mixed with the cement.

Fig. II is a similar view of the measuring apparatus; the "wet" mixer by which the ingredients are worked into a plastic mass; and the auger mill from which the material is forced in the form of a continuous ribbon.

Figs. III and IV are two sectional elevations of the rolling machine to which the shingles are next presented for moisture extraction and compression to the desired thickness. The plane of the section of Fig. IV is indicated by the arrows IV—IV in Fig. III.

Referring first to Fig. I, the crushing mill is comprehensively indicated by the numeral 1. Short fiber asbestos waste, usually furnished from the mines in bags 2, is dumped into the trough 3, of the mill through a suitable spout or chute 5. The material is disintegrated into its individual fibers by the action of the crushing rollers 6—6, driven through the interposed bevel gears 7 and 8, from the drive shaft 9 having the usual tight and loose pulleys 10 and 11. After the disintegration has been thoroughly effected the contents of the trough are discharged through a valve controlled conduit 12, into the pan 13 of a mixer. A proportionate amount of cement is then added and the contents of the pan thoroughly agitated in a dry state through the combined action of a plow 15, and perforated roller 16, these being simultaneously driven from the vertical shaft 17, which, in the present instance, is preferably common to the crushing mill 1.

After these dry ingredients are thoroughly mixed, they are discharged into a receiving trough 18. In practice, it has been found expedient to employ two or more of the organizations illustrated in Fig. 1, so that a continuous supply of the dry mixture may be at all times maintained in the trough.

A bucket conveyer 19, serves to elevate the dry mixture from the trough 18, and delivers to a receiving hopper 20, superimposed above a "wet" mixer indicated comprehensively at 30, to which the material is subsequently directed (Fig. II). An ample supply is constantly maintained in the hopper 20, and the desired quantities drawn from time to time by means of a valve 21, manually actuated by a handle 22. The discharge from the hopper 20, is received by a weighing bucket 23. This bucket is supported after the manner of a beam scale pivoted at 24, and provided with the weights 25. The bucket 23 is of the clam-shell type, and after the charge has been properly weighed, the contents are dumped, by operating handle 26, into the trough 31 of the "wet" mixer 30.

To the weighed mixture of asbestos and cement is now added a measured quantity of water necessary for compounding. This water is supplied to the trough through a pipe 32, extending from a measuring tank 33, which is in turn supplied from a water main 35. The filling and discharging of the tank are respectively controlled through the hand operated valves 36 and 37, a sight glass 38, serving to facilitate the former of these operations.

The contents of the wet mixer are constantly agitated by paddles 39, carried by a rotating spider 40, fixed to the vertical shaft 41. This shaft is driven from any convenient source of power by bevel gears 42 and 43. An auger 45, also fixed to said shaft, assists in the mixing operation.

The wet mixer 30, is supplemented by a storage tank 46, of a diameter considerably less than that of the trough, but preferably of greater capacity, so that an ample and constantly homogeneous supply may at all times be maintained in the tank, notwithstanding the intermittent delivery from the mixer. Communication between the trough and the tank is controlled through a gate valve of which the movable disk is indicated at 47. This valve is adapted for hand operation through any convenient instrumentalities (not shown) so that after the contents of the trough have been thoroughly mixed they are discharged into the storage tank under the assistance of the auger 45.

The shaft 41, extends longitudinally through the storage tank 46, to afford attachment for a series of spiral paddles 48, which serve the double function of agitating and at the same time compressing the plastic mixture downwardly to the auger mill illustrated at 50, the bottom of Fig. II. By this action of the paddles, a homogeneous plastic mass is delivered to the auger mill. This is exceedingly important, since the presence of any imprisoned air would result ultimately in a defective product.

Generally speaking, the auger mill 50 is of well known construction, comprising essentially the cylinder 51, within which the auger (not shown) operates, the latter being driven through the interposed gearing 52, from pulleys 53. The outlet of the mill is in the form of a conical extension 55, of the cylinder 51, which extension, by virtue of the gradual attenuation of its interior, further insures the homegeneity of the mass which ultimately issues from a die 56, in which the extension 55, terminates. The opening in this die is of such form as to produce a continuous ribbon of the plastic mass, (or other suitable form) as the latter is extruded under pressure, by the action of the auger mill as already noted. The ribbon thus formed, is severed at regular intervals to form sections or sheets of predetermined dimensions. These are represented in the drawings by the letter "S." The cutting of the sheets is preferably accomplished in the present instance by a wire cutter 57, capable of being intermittently reciprocated by any approved mechanism for this purpose.

The sheets, in the process of their formation, are received upon the lower apron 61, of a rolling machine diagrammatically represented at 60, in Fig III of the drawings. This apron is made of a highly absorbent material and is endless in form. It travels continuously under propulsion of a pair of pressure rolls 62 and 63, and its course is otherwise determined through the assistance of idler rolls 64, 65, 66, 67 and 68. A second endless absorbent apron 70, adapted to operate in opposition to the apron 61, is progressed at complementary surface speed under the action of pressure rolls 71 and 72, superimposed upon, and coöperative with the rolls 62 and 63. This apron also traverses a circuitous path, determined by the idlers 64, 65 and 66. The lower rolls 62—63 are journaled in fixed bearings, but for the purposes of regulating the pressure exerted by the upper rolls, the latter are journaled in bearings, supported by movable beams 77—77, pivoted at 78—78 to the framework of the machine. The free ends of these beams are adjustably connected to the frame of the machine by tie rods 79—79, having interposed turn buckles, by which said rods may be lengthened or shortened according to the pressure desired. As the sheets S are advanced between the aprons 61 and 70, as shown in Fig. III, the pressure exerted by the operation of the instrumentalities just described results in the extraction of the surplus moisture which is immediately absorbed by the aprons. Located along the circuit of the lower apron 61, is a spray 72, by which any adhering particles of the material are washed off, and directly adjacent the spray is a revolving paddle 73, by which the greater amount of wash-water is eliminated. The extraction of the remaining moisture is completed before the apron is presented at the active portion of its circuit by means of a squeeze roll 75, operating in opposition to the idler 66, hereinbefore referred to.

The upper apron 70 is also provided with a cleaning element and moisture extractor in the form of a revolving brush 76.

In the practice of my invention, I find it highly desirable to impart a second rolling to the sheets, preferably in a direction at right angles to the first rolling operation above noted. Accordingly, the rolling machine comprises a second group of rolling elements which operate in a direction at right angles to the first group, the profile of the secondary group being illustrated in Fig. IV of the drawings. From examination of this figure, it will be apparent that this second group is substantially a counterpart of the first group illustrated in Fig. III. In this instance the lower absorbent apron 80, is progressed under the action of the pressure rolls 81 and 82, and idlers 83, 84 and 85, for a purpose analogous to that already understood. The opposing upper absorbent apron 90 is similarly propelled by the pressure rolls 91 and 92, suitable idlers 93, 94 and 95 being provided as before. Since the action of the rolling elements is apparent from the previous description, it will suffice to say that the secondary rolling accomplished in a transverse direction to the first rolling is functional in practically eliminating the moisture from the sheets so that they are delivered in a substantially solid state from the machine.

In order to transfer the sheets without interruption from the first rolling section of the machine to the second, a transfer mechanism has been provided which may be briefly described as follows:

After leaving the first rolling section of the machine (Fig. III) the sheets are delivered upon a roller trestle 96, which serves as a bridging means leading to a speed accelerator in the form of a pair of opposed belts 97 and 98, operated at a surface speed substantially twice that of the aprons 61 and
70. By this arrangement, the spacing interval between successive sheets is increased to an extent sufficient to permit the lapse of a time period of sufficient duration for the operation of the transfer turnstile 100 (Figs. III and IV) to which the sheets are successively advanced by the accelerator. As best shown in Fig. IV, this turnstile consists of a four-armed spider intermittently rotated by a Geneva movement comprehensively indicated at 101. Through the employment of such a movement, a rapid action of the turnstile is effected whereby the sheets are successively dropped upon the lower apron 80 of the secondary rolling mechanism shown in Fig. IV, without danger of distortion or rupture.

Since the showing of Figs. III and IV is purely diagrammatic, the intermediaries by which the intermittent action of the turnstile is controlled have been omitted, but these may be of any approved construction capable of performing the desired function.

It is often desirable to identify the sheets with printing of some sort, and to this end, the secondary rolling section of the machine has been provided with a type roller 105 (Fig. IV) operating against the lower faces of the shingles in opposition to a platen roll 106, by which the upper apron 90 is buttressed. The lower apron 80 is diverted from its normal course by idlers 107, 108 and 109, to allow the insertion of the type roll 106.

When tinted sheets are desired, the apparatus may be supplemented by a dry color applying device illustrated adjacent to the delivery end of the secondary section of the rolling machine in Fig. IV. This color applying device includes a supply hopper 110 for the coloring pigment in powdered form.
The outlet of the hopper 110 is controlled by a revolving grooved cylinder 111, through the action of which a limited supply of the coloring matter is dropped upon an applying brush 112. This brush revolves at a somewhat higher surface speed than that of the sheets and in a complementary direction to that of their travel. Thorough application of the coloring matter to the moist sheets is further assured through a counter-revolving application brush 113, rotating at high speed. After this operation, the sheets are delivered to any convenient point for storage by the endless conveyer shown at 115 in Fig. IV.
The various devices by which my process may be carried out are driven by any convenient means provided that the rate of flow of the material from the forming die and progression thereafter are so related that a continuous operation is effected as already noted.

Having thus described my invention, I claim:

1. The continuous process of manufacturing fibrous cement products which consists of combining cement, fiber and water, thoroughly mixing the same to produce a homogeneous mass, feeding the same continuously through the die of an auger mill, cutting the extruded mass into desired lengths and subjecting them to treatment for removal of water, and allowing the material of the product to set.

2. The continuous process of manufacturing fibrous cement products, which consists of combining cement, fiber and water, thoroughly mixing the same to produce a homogeneous mass, passing through an equalizing reservoir a constant supply of the mass to insure homogeneity feeding the same continuously through the die of an auger mill, cutting the extruded mass into desired lengths, subjecting them to treatment for removal of water, and allowing the material of the product to set.

3. The continuous process of manufacturing fibrous cement products, which consists of combining cement, fiber and water, thoroughly mixing the same to produce a homogeneous mass, passing through an equalizing reservoir a constant supply of the mass to insure homogeneity, feeding the same continuously through the die of an auger mill, cutting the extruded mass into desired lengths, subjecting them to a rolling operation for the extraction of the water, and allowing the material of the product to set.

4. The continuous process of manufacturing fibrous cement products, which consists of combining cement, fiber and water, thoroughly mixing the same to produce a homogeneous mass, passing through an equalizing reservoir a constant supply of the mass to insure homogeneity, feeding the same continuously through the die of an auger mill, cutting the extruded mass into desired lengths, rolling them first in one direction then at right angles to the first rolling for the extraction of the water, and allowing the material of the product to set.

5. The continuous process of manufacturing fibrous cement products which consists in initially mixing cement and fiber in a dry state; adding to this mixture the requisite water for compounding; working the mixture into a homogeneous plastic mass; maintaining a constant supply of said mass in an equalizer to insure homogeneity; feeding the same continuously through the die of an auger mill; cutting the extruded mass into desired lengths; rolling them first in one direction and then again at right angles to the first rolling for the extraction of the water; and allowing the material of the product to set.

6. The continuous process of manufacturing fibrous cement products which consists of combining cement, fiber and water, thoroughly mixing the same to produce a homogeneous mass, feeding the same continuously through the die of an auger mill, cutting the extruded mass into desired lengths, subjecting them to treatment for removal of water, applying to them a dry coloring pigment, and allowing the material of the product to set.

In testimony whereof, I have hereunto signed my name at Philadelphia, Pennsylvania, this tenth day of February 1919.

RICHARD V. MATTISON, Jr.

Witnesses:
JAMES H. BELL,
E. L. FULLERTON.